(12) United States Patent
Plunkett

(10) Patent No.: US 8,128,098 B2
(45) Date of Patent: Mar. 6, 2012

(54) MULTI-LAYERED GASKET

(75) Inventor: Tom Plunkett, Aurora, IL (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 348 days.

(21) Appl. No.: 12/589,329

(22) Filed: Oct. 22, 2009

(65) Prior Publication Data

US 2011/0095488 A1    Apr. 28, 2011

(51) Int. Cl.
*F02F 11/00* (2006.01)

(52) U.S. Cl. .......................... 277/593; 277/598

(58) Field of Classification Search .......... 277/592–595, 277/598
See application file for complete search history.

(56) References Cited

U.S. PATENT DOCUMENTS

| | | | |
|---|---|---|---|
| 4,728,110 A | 3/1988 | Nakasone | |
| 5,232,229 A * | 8/1993 | Udagawa | 277/595 |
| 5,306,024 A | 4/1994 | Udagawa | |
| 6,769,696 B2 * | 8/2004 | Diez et al. | 277/593 |
| 6,951,338 B2 | 10/2005 | Kestly | |
| 6,994,353 B2 | 2/2006 | Kinoshita | |
| 7,000,924 B2 | 2/2006 | Hohe et al. | |
| 7,204,491 B2 * | 4/2007 | Hatamura et al. | 277/593 |
| 7,287,757 B2 | 10/2007 | Chen et al. | |
| 2005/0206091 A1 | 9/2005 | Detmann et al. | |
| 2006/0061045 A1 * | 3/2006 | Burg | 277/593 |
| 2007/0267822 A1 | 11/2007 | Imai | |
| 2008/0174075 A1 | 7/2008 | Diez et al. | |
| 2010/0109256 A1 * | 5/2010 | Goettler et al. | 277/592 |

FOREIGN PATENT DOCUMENTS

| | | |
|---|---|---|
| DE | 36 01 346 A1 | 7/1987 |
| DE | 37 20 224 A1 | 1/1989 |
| JP | 2004 278719 A | 10/2004 |
| WO | WO 01/96768 A1 | 12/2001 |

* cited by examiner

*Primary Examiner* — Vishal Patel
(74) *Attorney, Agent, or Firm* — Marshall & Melhorn LLC

(57) ABSTRACT

A gasket is described having a middle layer, two metal layers and an uppermost and a lowermost layer. The middle layer may have an upper surface and a lower surface defining a first planar portion, a wave portion and a second planar portion. The metal layers sandwich the middle layer and are substantially planar. An uppermost active layer is located above the first intermediate layer. The uppermost active layer comprises a first planar portion, a first bead portion, and a second planar portion. The lowermost active layer is located below the second intermediate layer. The lowermost active layer also comprises a first planar portion, a first bead portion, and a second planar portion.

12 Claims, 3 Drawing Sheets

_US 8,128,098 B2_

MULTI-LAYERED GASKET

FIELD OF THE INVENTION

The present invention relates to a gaskets and more particularly to a multi-layered gasket for a vehicle.

BACKGROUND OF THE INVENTION

Gaskets are well-known devices for sealing two or more components that have been joined together. For example, gaskets are used in the vehicle industry for creating a fluid tight seal between various engine components. Two engine components that typically need a gasket to seal them together are the cylinder head and cylinder block.

Various gaskets exist to seal between the cylinder head and the cylinder block, particularly for the automobile and light truck industry. However, these gaskets are typically not robust enough for heavy duty applications. One gasket design that has been used in heavy duty applications utilizes a wire ring between two gasket layers to assist in sealing. However, it has been found that the wire is susceptible to being overly crushed during high thermal loading conditions on the engine.

Thus, it would be advantageous for a gasket to be adaptable to high thermal loading conditions in heavy duty applications as well as other pertinent applications.

SUMMARY OF THE INVENTION

One embodiment of the present invention is directed toward a gasket comprising a middle layer, two metal layers and an uppermost and a lowermost layer. The middle layer has an upper surface and a lower surface defining a first planar portion, a wave portion and a second planar portion. The first intermediate layer has planar upper and lower surfaces. The second intermediate layer has planar upper and lower surfaces. An uppermost active layer is located above the first intermediate layer. The uppermost active layer comprises a first planar portion, a first bead portion, a second planar portion and a second bead portion. The lowermost active layer is located below the second intermediate layer. The lowermost active layer also comprises a first planar portion, a first bead portion, a second planar portion and a second bead portion.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
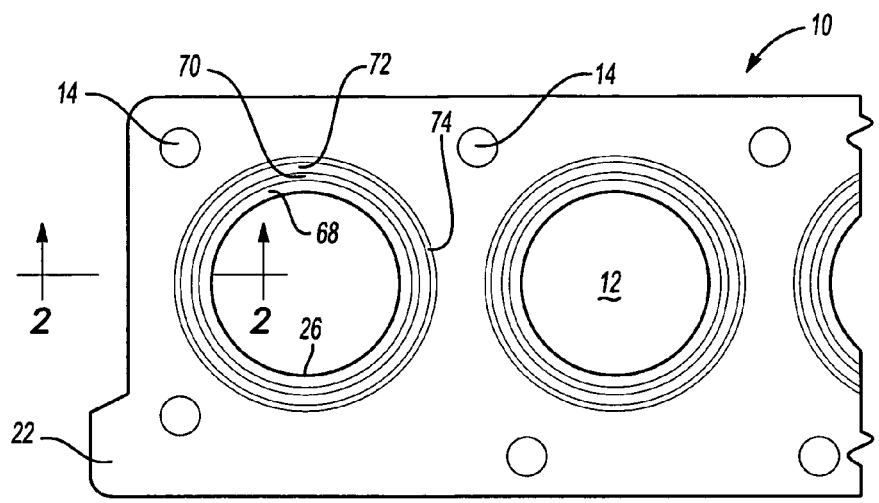
FIG. 1 is a plan view of a gasket for a vehicle.

Referring now to FIG. 1, a top view depicting a portion of a gasket 10 is provided. The gasket 10 comprises at least one combustion opening 12, but additional combustion openings 12 are permissible. Bolt and/or fluid openings 14, known by those skilled in the art, are also provided in the gasket 10.

Figure 2:
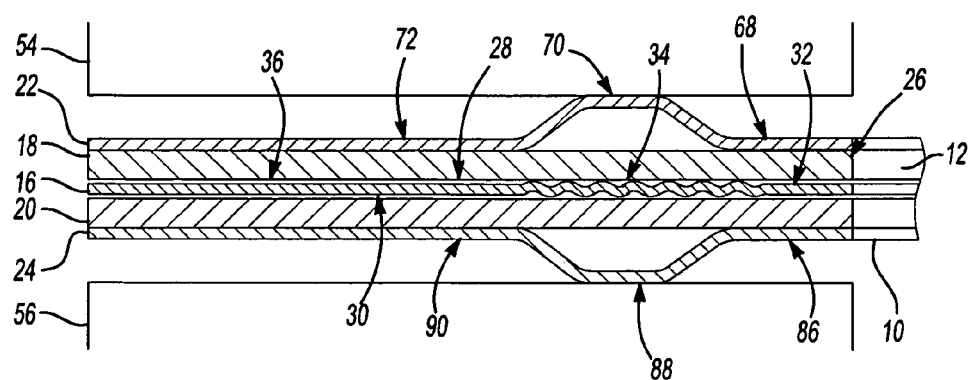
FIG. 2 is a sectional view taken along lines 2-2 of FIG. 1 and depicted between two vehicle components.
Figure 3:
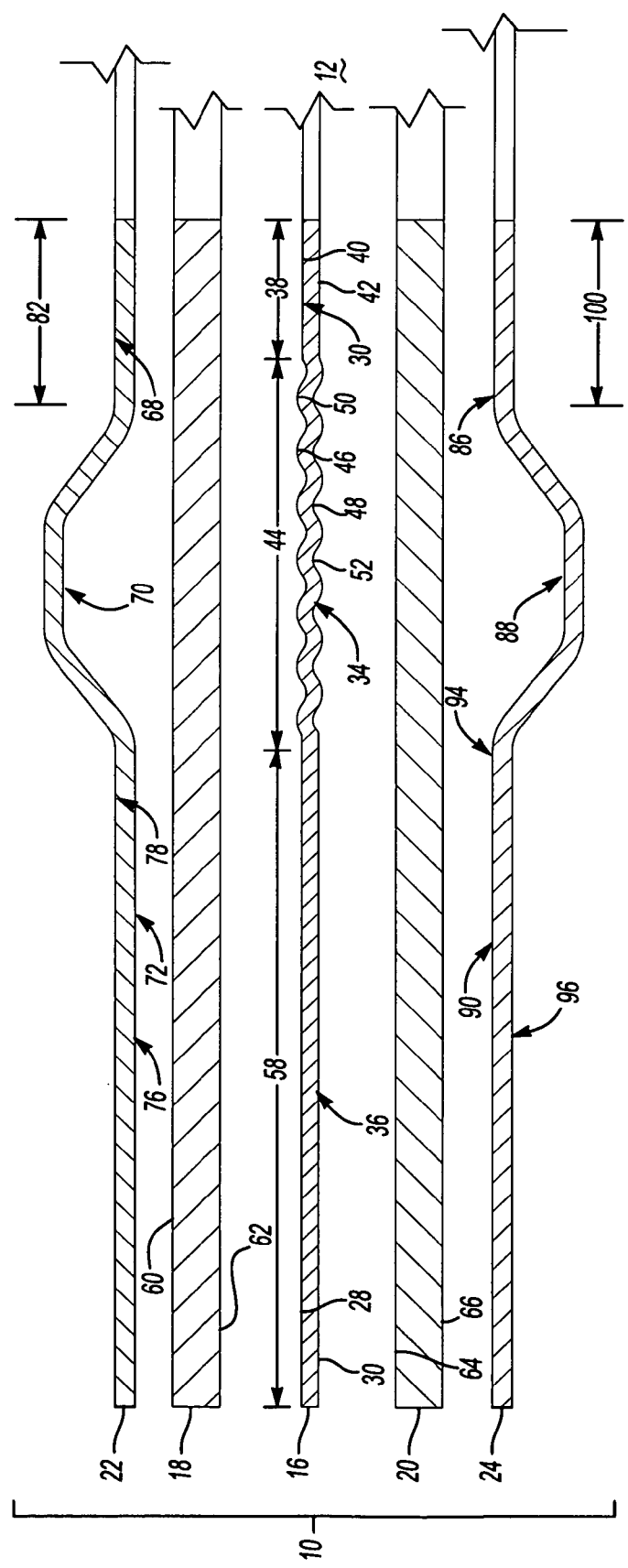
FIG. 3 is an exploded side view of the gasket of FIG. 2.

As depicted in FIG. 2, the gasket preferably comprises 5 layers, including a middle layer 16, a first intermediate layer 18, a second intermediate layer 20, an uppermost layer 22 and a lowermost layer 24. All of the layers, individually and together, form a perimeter 26 for the combustion opening 12.

Figure 4:
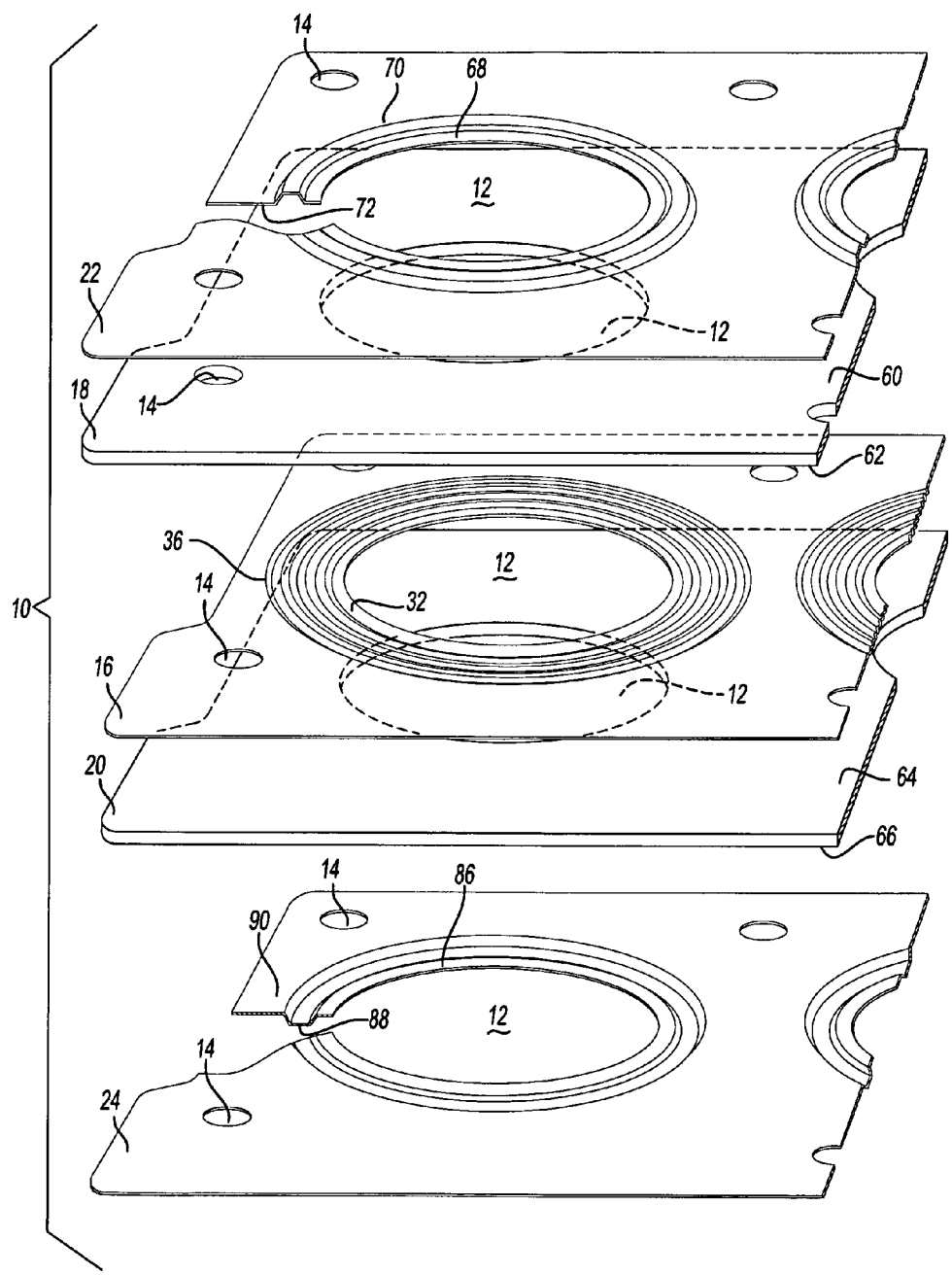
FIG. 4 is an exploded perspective view of a portion of the gasket of FIG. 1.

The middle layer 16 comprises an upper surface 28 and a lower surface 30. The surfaces 28, 30 together define a first planar portion 32, a wave portion 34 and a second planar portion 36 of the middle layer 16. The first planar portion 32 extends entirely circumferentially about the combustion opening 12 and it extends into the gasket 10 for a predetermined radial distance 38, as best seen in FIG. 4. The first planar portion 32 has an upper surface 40 that is planar and a lower surface 42 that is planar and parallel with the upper surface 40.

As can be appreciated by FIG. 4, the wave portion 34 entirely circumferentially extends about the first planar portion 32 and it extends inwardly into the gasket for a predetermined radial distance 44. The wave portion 34 comprises a plurality of continuously connected crests 46 and troughs 48.

In the depicted embodiment, the vertices 50, 52 of all of crests 46 and all of the troughs 48 are located above and below, respectively, the upper and lower surfaces 28, 30 of the middle layer. While the crests and troughs 46, 48 are depicted in FIG. 2 at one amplitude and frequency, the crests and troughs 46, 48 may be of various amplitudes and frequencies best suited to the particular situation.

The wave portion 34 is helpful to the gasket 10 in adapting to the varying liner protrusions and hardware stiffnesses of various engines, including heavy duty engines, particularly when the amplitude and the frequency can be varied for the particular situation. When the gasket 10 is assembled between a head and a block as shown in FIG. 2, the waves of the wave portion 34 plastically deform into the adjacent steel layers 18, 20. As used herein the term "plastically" means that the wave portion 34 remains in a deformed state after a load is added and then removed. The waves of the wave portion 34 cannot be overcrushed as the plastic deformation is limited by the selected height of the waves.

The second planar portion 36 of the middle layer 16 preferably extends entirely circumferentially about the wave portion 34 and it extends radially into the gasket 10 for a predetermined radial distance 58, as seen in FIG. 4.

In the depicted embodiment, the first planar portion extends 32 radially into the gasket for a predetermined radial distance 38 that is less than the radial distance 44 the wave portion 34 extends into the gasket 10. The depicted embodiment also shows that the wave portion 34 extends radially into the gasket 10 less than the radial distance 58 that the second planar portion 36 extends into the gasket 10. In other embodiments of the present invention, these distances can vary with respect to one another.

Preferably, the middle layer 16, including the first planar portion 32, the wave portion 34 and the second planar portion 36 are one piece, unitary and integrally formed with one another.

The first intermediate layer has an upper surface 60 and a lower surface 62. Preferably, the surfaces 60, 62 are substantially entirely planar and parallel to one another. Furthermore, it is preferred that the upper and lower surfaces 60, 62 are substantially parallel to the first planar portion 32 and the second planar portion 36 of the middle layer 16. In the depicted embodiment, the upper and the lower surfaces 60, 62 extend in a planar fashion from the combustion opening 12 beyond the wave portion 34 of the middle layer 16. When the gasket 10 is installed in an engine, and the layers 16-24 are compressed against one another, the lower surface 62 of the first intermediate layer 18 abuts at least the vertices 50 of the crests 46 of the middle layer 16.

The second intermediate layer 20 has an upper surface 64 and a lower surface 66. The surfaces 64, 66 are substantially planar and parallel to one another. The upper and lower surfaces 64, 66 are preferably substantially parallel to the first planar portion 32 and the second planar portion 36 of the middle layer 16. Furthermore, it is preferred that the upper and the lower surfaces 64, 66 extend in a planar fashion from the combustion opening 12 and beyond the wave portion 34 of the middle layer 16. When the gasket 10 is installed in an engine, and the layers 16-24 are compressed against one another, the upper surface 64 of the second intermediate layer 20 abuts at least vertices the troughs 48 of the middle layer 16.

As can be appreciated from the foregoing, it is preferred that the first and second intermediate layers 18, 20 be substantially identical to one another and be substantially identically positioned with respect to one another above and below the middle layer 16 in the gasket 10. It is also preferred that each of the first and second intermediate layers 18, 20 be one-piece, unitary and integrally formed.

The uppermost active layer 22 is located above the first intermediate layer 18. The layer 22 preferably comprises a first planar portion 68, a first bead portion 70 and a second planar portion 72, in order, from the combustion opening 12 and extending radially outward into the gasket 10. Preferably, the first planar portion 68 and the second planar portion 72 are parallel to the first intermediate layer 18. It is also preferred that the first bead portion 70 is radially aligned with the wave portion 34 of the middle layer 16.

The uppermost active layer 22 comprises an inner surface 76 and an outer surface 78, which together define the first planar portion 68, the first bead portion 70 and the second planar portion 72. At least a portion of the outer surface 78 of the uppermost active layer 22 is adapted to abut the cylinder head 54, while at least a portion of the inner surface 76 is adapted to abut the first intermediate layer 18. The inner surface 76 preferably has the same cross-sectional profile as the outer surface 78 cross-sectional profile.

Preferably, the first bead portion 70 is horizontally aligned, but vertically offset from the wave portion 34 of the middle layer 16. While a bead portion 70 and two planar portions 68, 72 are depicted in the uppermost layer 22, additional bead portions and planar portions are permissible.

In the depicted embodiment, the first planar portion 68 has a length 82 less than the length of the second planar portion 72, which is length 80. These lengths 80, 82 however, may vary with respect to one another.

Preferably, the first planar portion 68, the first bead portion 70 and the second planar portion 72 are one-piece, unitary and integrally formed.

The lowermost active layer 86 is located below the second intermediate layer 20. The layer 86 preferably comprises a first planar portion 86, a first bead portion 88 and a second planar portion 90, in order, from the combustion opening 12 and extending radially outward into the gasket 10. Preferably, the first planar portion 86 and the second planar portion 90 are parallel to the second intermediate layer 20. It is also preferred that the first bead portion 88 is radially aligned with the wave portion 34 of the middle layer 16.

The lowermost active layer 24 comprises an inner surface 94 and an outer surface 96, which together define the first planar portion 86, the first bead portion 88 and the second planar portion 90. At least a portion of the outer surface 96 of the lowermost active layer 24 is adapted to abut the cylinder block 56, while at least a portion of the inner surface 94 is adapted to abut the second intermediate layer 20. The inner surface 94 preferably has the same cross-sectional profile as the outer surface 96 cross-sectional profile.

Preferably, the first bead portion 88 is horizontally aligned, but vertically offset from the wave portion 34 of the middle layer 16. While a bead portions 88 and two planar portions 86, 90 are depicted in the lowermost layer 24, additional bead portions and planar portions 88, 92 are permissible.

In the depicted embodiment, the first planar portion 86 has a length 100 less than the length of the second planar portion 90, which is distance 98. These lengths 98, 100, however, may vary with respect to one another.

Preferably, the first planar portion 86, the first bead portion 88 and the second planar portion 90 are one-piece, unitary and integrally formed.

It can be appreciated from the foregoing that the lowermost layer 24 and the uppermost layer 22 are substantially identical, if not identical to one another. Other embodiments of the present invention are permissible wherein variations in the number of beads and/or planar portion in the two layers are permissible so that the layers are not identical.

In the depicted embodiment wherein the uppermost and the lowermost layers 22, 24 are identical, it can be appreciated that the bead portions 70, 88 of the layers 22, 24 are the same height and shape. Furthermore, in the same embodiment the first planar portions 68, 86 of the uppermost layer 22 and the lowermost layer 24 are the same length, the first bead portions 70, 88 of the uppermost layer 22 and the lowermost layer 24 are the same length, and the second planar portions 72, 90 of the uppermost layer 22 and the lowermost layer 24 are the same length.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A gasket, comprising:
a middle layer surrounding a combustion opening, said middle layer comprising an upper surface and a lower surface defining a first planar portion, a wave portion and a second planar portion, wherein said first planar portion extends entirely circumferentially about said combustion opening for a predetermined radial distance, said wave portion entirely circumferentially extends about said first planar portion for a predetermined radial distance, said wave portion comprising a plurality of continuously connected crests and troughs, wherein vertices of all of said crests and troughs are located above and below, respectively, said upper and lower surfaces, wherein said second planar portion extends entirely circumferentially about said wave portion for a predetermined radial distance;
a first intermediate layer having an upper surface and a lower surface, said surfaces being substantially entirely planar and parallel to one another, said surfaces also being substantially parallel to said first planar portion and said second planar portion of said middle layer, said upper and said lower surfaces extending in a planar fashion from said combustion opening beyond said wave portion of said middle layer, wherein said lower surface of said first intermediate layer abuts at least said vertices of said waves;

a second intermediate layer having an upper surface and a lower surface, said surfaces being substantially planar and parallel to one another, said surfaces also being substantially parallel to said first planar portion and said second planar portion of said middle layer, said upper and said lower surfaces extending in a planar fashion from said combustion opening beyond said wave portion of said middle layer, wherein said upper surface of said second intermediate layer abuts at least said vertices of said troughs;

an uppermost active layer located above said first intermediate layer, said uppermost active layer comprising a first planar portion, a first bead portion, and a second planar portion, in order, from said combustion opening, wherein said first planar portion and said second planar portion are parallel to said first intermediate layer, and wherein said first bead portion is vertically aligned with said wave portion of said middle layer; and a lowermost active layer located below said second intermediate layer, said lowermost active layer comprising a first planar portion, a first bead portion, and a second planar portion, in order, from said combustion opening, wherein said first planar portion and said second planar portion are parallel to said second intermediate layer, and wherein said first bead portion is vertically aligned with said wave portion of said middle layer.

2. The gasket of claim 1, wherein said middle layer, said first and said second intermediate layers, said uppermost layer and said lowermost layer are metal.

3. The gasket of claim 1, wherein each of said layers form a perimeter of said combustion opening.

4. The gasket of claim 1, wherein said lowermost active layer comprises an inner surface and an outer surface, wherein said inner surface has the same profile as the outer surface profile and wherein said outer surface contacts a cylinder head.

5. The gasket of claim 1, wherein said uppermost active layer comprise an inner surface and an outer surface, wherein said inner surface has the same profile as the outer surface profile and wherein said outer surface contacts a cylinder block.

6. The gasket of claim 1, wherein said bead portions of said uppermost layer and said bead portions of said lowermost layer are the same height.

7. The gasket of claim 1, wherein said first planar portions of said uppermost layer and said lowermost layer are the same length, said first bead portions of said uppermost layer and said lowermost layer are the same length, and said second planar portions said uppermost layer and said lowermost layer are the same length.

8. The gasket of claim 1, wherein said first planar portion of said middle layer is shorter than said wave portion of said middle layer.

9. The gasket of claim 1, wherein said wave portion of said middle layer is shorter than said second planar portion of said middle layer.

10. The gasket of claim 1, wherein said crests and troughs of said wave portion of said middle layer are of equal height.

11. A gasket, comprising:

a metal middle layer surrounding a combustion opening, said middle layer comprising an upper surface and a lower surface both defining a first planar portion, a wave portion and a second planar portion, in order from a combustion opening, said wave portion comprising a plurality of continuously connected crests and troughs, wherein vertices of all of said crests and troughs are located above and below, respectively, said upper and lower surfaces;

a first intermediate layer directly above said middle layer, said first intermediate layer having an upper surface and a lower surface, said lower surface adapted to abut crests of said wave portion, said upper and lower surfaces being substantially entirely planar and parallel to one another and planar with respect to said first planar portion and said second planar portion of said middle layer, said upper and said lower surfaces extending in a planar fashion from said combustion opening beyond said wave portion of said middle layer;

a second intermediate layer directly below said middle layer and comprising a mirror image of said first intermediate layer and adapted to abut said troughs of said wave portion;

an uppermost active layer located above said first intermediate layer, said uppermost active layer comprising a first planar portion, a first bead portion, and a second planar portion, in order, from said combustion opening, wherein said first planar portion and said second planar portion are parallel to said first planar portion and said second planar portion of said middle layer, and wherein said first planar portion and said second planar portion of said middle layer are horizontally aligned with said first and second planar portions of said active layer; and a lowermost active layer located below said second intermediate layer, said lowermost active layer comprising a mirror image of said uppermost active layer.

12. The gasket of claim 11, wherein each of said layers are individually unitary and integrally formed.

* * * * *